(12) United States Patent
McClintock et al.

(10) Patent No.: US 10,438,511 B2
(45) Date of Patent: Oct. 8, 2019

(54) GROWING SPINE MODEL

(71) Applicant: K2M, Inc., Leesburg, VA (US)

(72) Inventors: Larry McClintock, Gore, VA (US); Harry Paul, Port Washington, NY (US); Robert Boyd, Winchester, VA (US)

(73) Assignee: K2M, Inc., Leesburg, VA (US)

( * ) Notice: Subject to any disclaimer, the term of this patent is extended or adjusted under 35 U.S.C. 154(b) by 1286 days.

(21) Appl. No.: 14/539,453

(22) Filed: Nov. 12, 2014

(65) Prior Publication Data
US 2015/0170548 A1    Jun. 18, 2015

Related U.S. Application Data

(60) Provisional application No. 61/902,334, filed on Nov. 11, 2013.

(51) Int. Cl.
*G09B 23/32* (2006.01)
(52) U.S. Cl.
CPC .................................. *G09B 23/32* (2013.01)
(58) Field of Classification Search
CPC .................................. G09B 23/30; G09B 23/32
See application file for complete search history.

(56) References Cited

U.S. PATENT DOCUMENTS

| | | | |
|---|---|---|---|
| 2,108,229 A | 2/1938 | Metz | |
| 2,197,975 A | 4/1940 | Fleet | |
| 3,513,569 A | 5/1970 | Herou | |
| 3,645,153 A * | 2/1972 | Northcraft | F16H 37/08 475/198 |
| 3,742,781 A * | 7/1973 | Boyriven | G05G 11/00 74/425 |
| 3,790,133 A * | 2/1974 | Jones | B66C 23/78 254/103 |
| 4,318,573 A * | 3/1982 | Hamman | F16C 35/02 384/192 |

(Continued)

FOREIGN PATENT DOCUMENTS

| | | | |
|---|---|---|---|
| DE | 605262 C | 11/1934 | |
| EP | 0198640 A2 * | 10/1986 | B29D 30/0016 |

(Continued)

*Primary Examiner* — Sam Yao
*Assistant Examiner* — Jennifer L Korb
(74) *Attorney, Agent, or Firm* — Lerner, David, Littenberg, Krumholz & Mentlik, LLP

(57) ABSTRACT

A spine surgery modeling system simulates the spine with various vertebral body or disc conditions and allows a user to make adjustments and examine the three dimensional outcome of such adjustments. The spine surgery modeling system includes a spine model and a drive mechanism. The spine model has vertebral bodies and a disc space defined between adjacent vertebral bodies. The drive mechanism includes a worm gear, a worm, a rigid shaft, and a button. The worm engages the worm gear such that rotation of the worm causes rotation of the worm gear. The rigid shaft extends through a through hole defined in the worm and is configured to rotate the worm. The button is operatively engaged with the worm gear such that rotation of the worm gear causes movement of the button between collapsed and expanded states to change a height of the disc space.

20 Claims, 7 Drawing Sheets

(56) References Cited

U.S. PATENT DOCUMENTS

| | | | |
|---|---|---|---|
| 4,324,055 A * | 4/1982 | Hippensteel | E01H 5/06 |
| | | | 172/796 |
| 4,979,404 A * | 12/1990 | Nakata | F16H 55/24 |
| | | | 74/409 |
| 5,672,059 A | 9/1997 | Browne-Wilkinson | |
| 7,655,025 B2 * | 2/2010 | Ritland | A61B 17/7007 |
| | | | 606/258 |
| 7,942,676 B2 | 5/2011 | Murdach | |
| 8,113,847 B2 * | 2/2012 | Boachie-Adjei | G09B 23/32 |
| | | | 434/274 |
| 2008/0027436 A1 | 1/2008 | Cournoyer et al. | |
| 2013/0103156 A1 * | 4/2013 | Packer | A61F 2/442 |
| | | | 623/17.16 |

FOREIGN PATENT DOCUMENTS

| | | |
|---|---|---|
| EP | 2712560 A1 | 4/2014 |
| WO | 01/45576 A1 | 6/2001 |

* cited by examiner

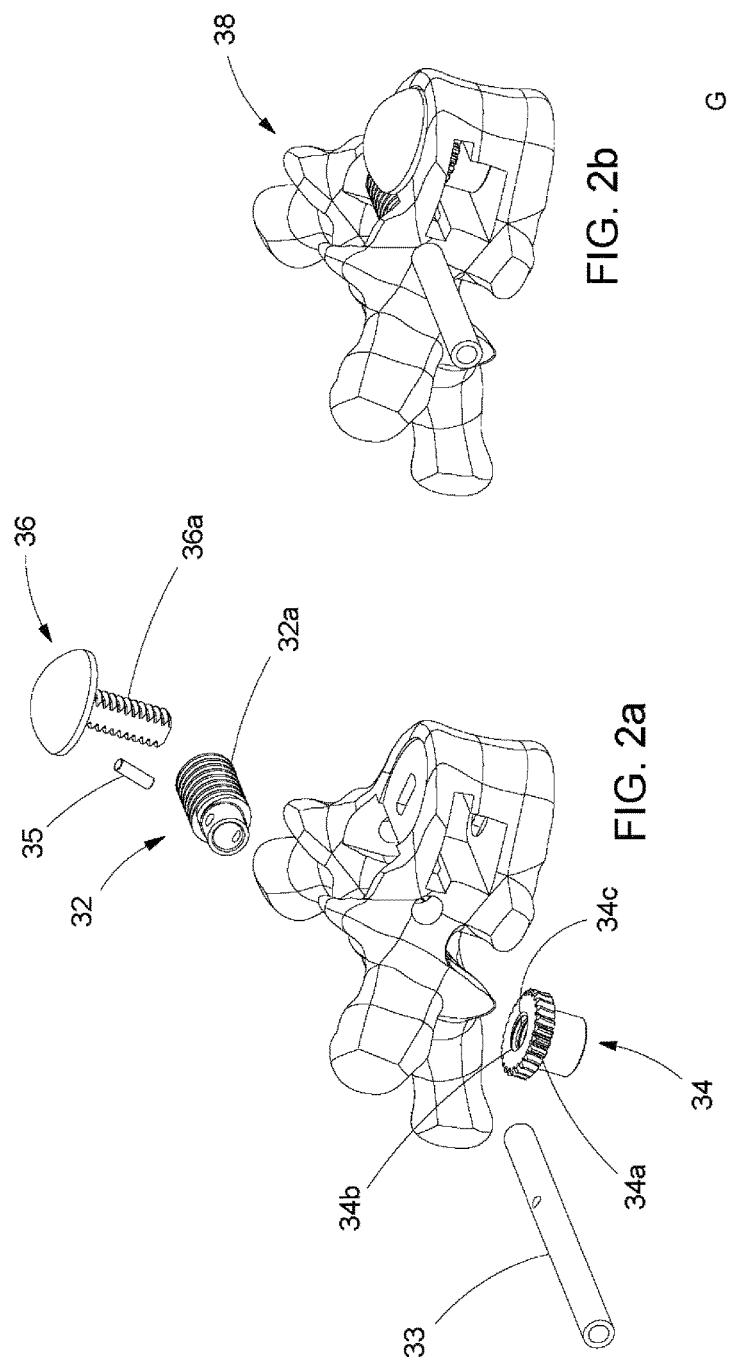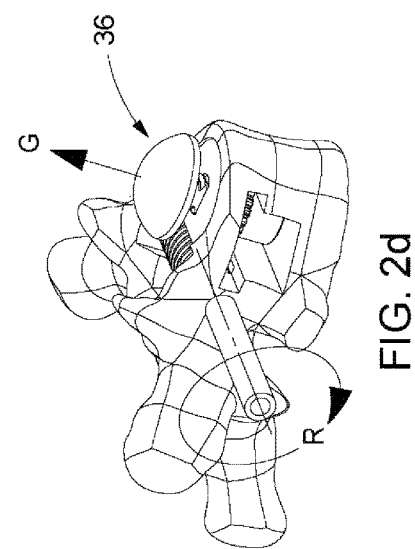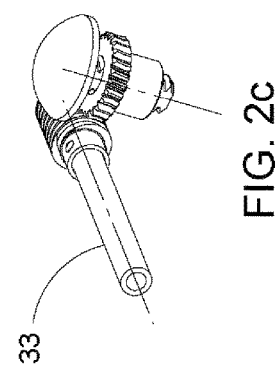

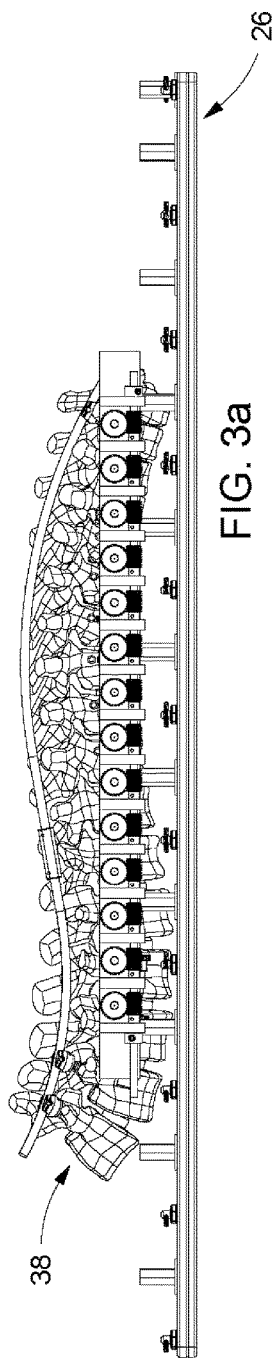
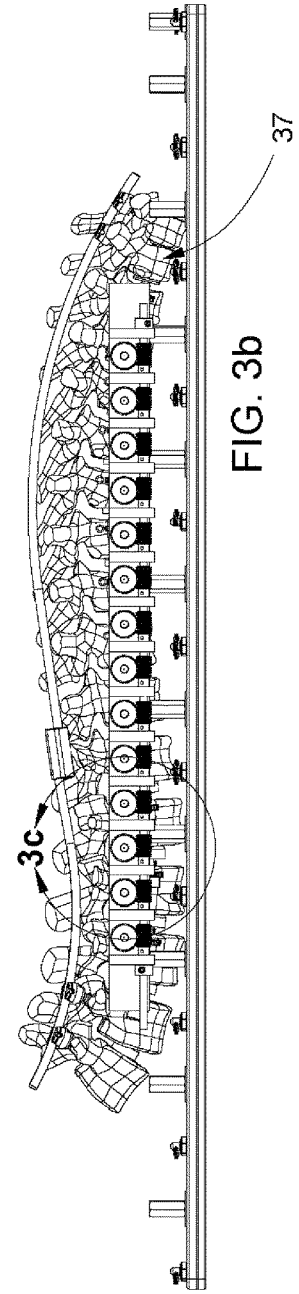
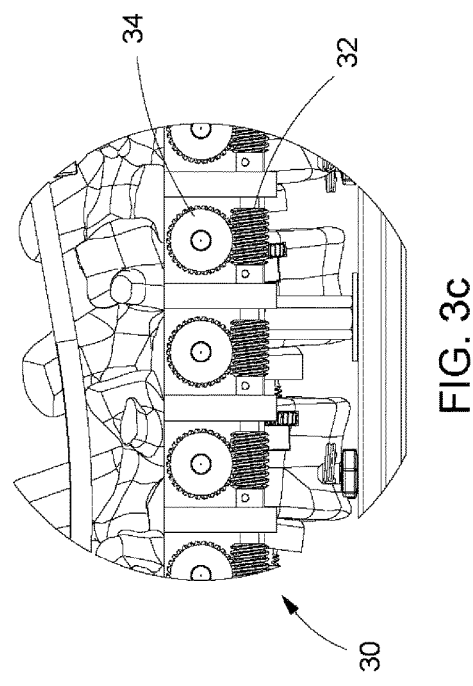

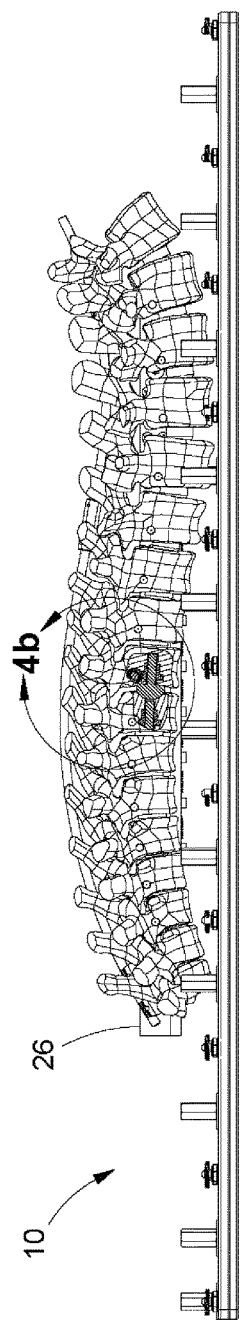
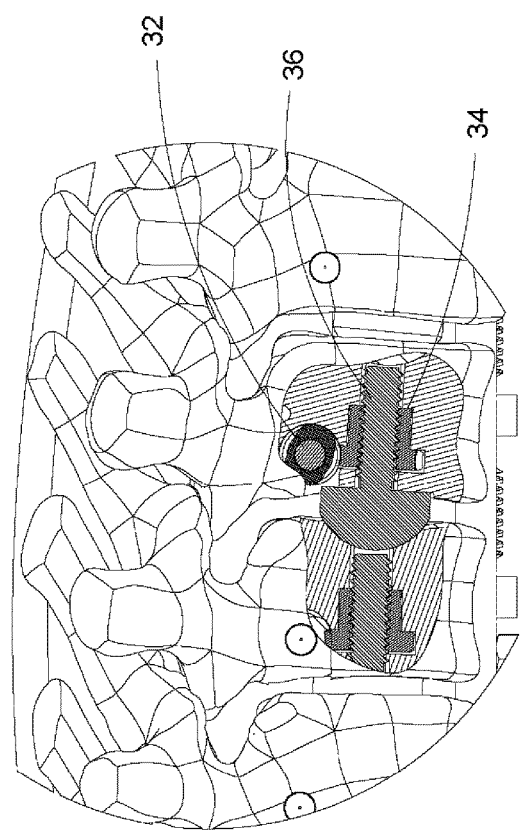

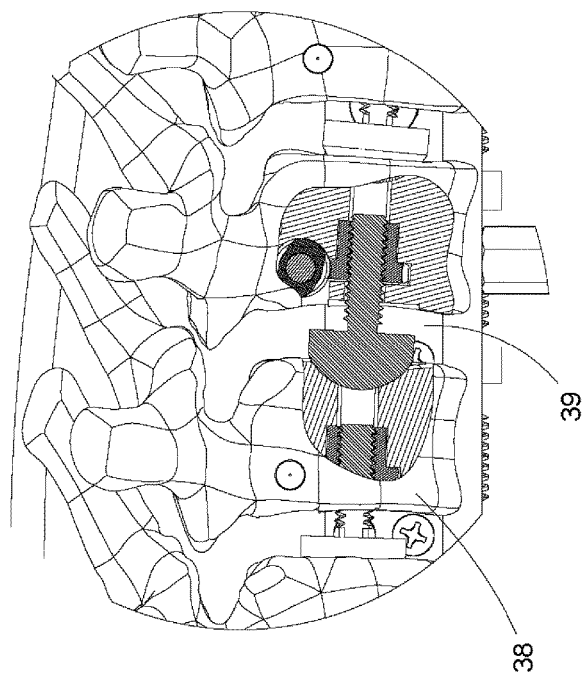
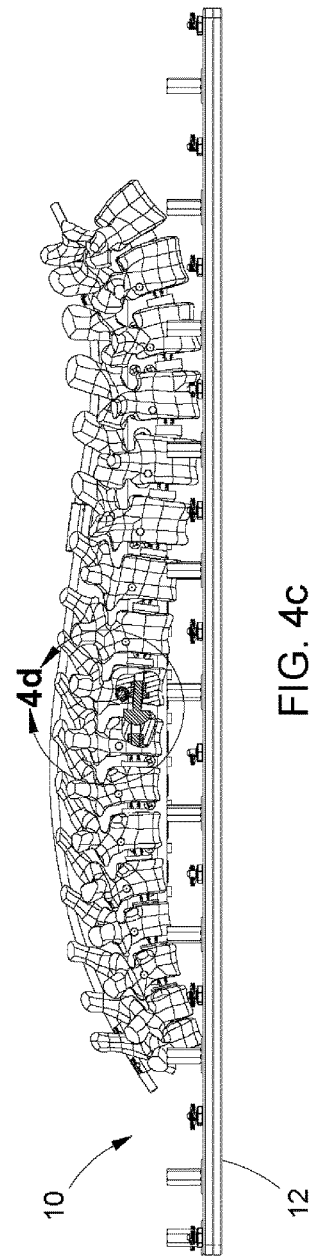
FIG. 4d
FIG. 4c

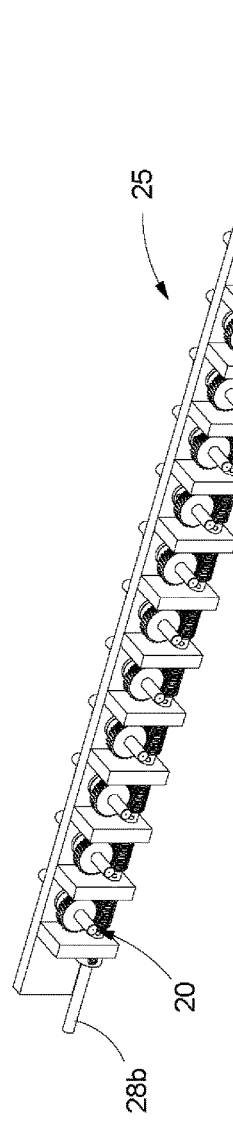
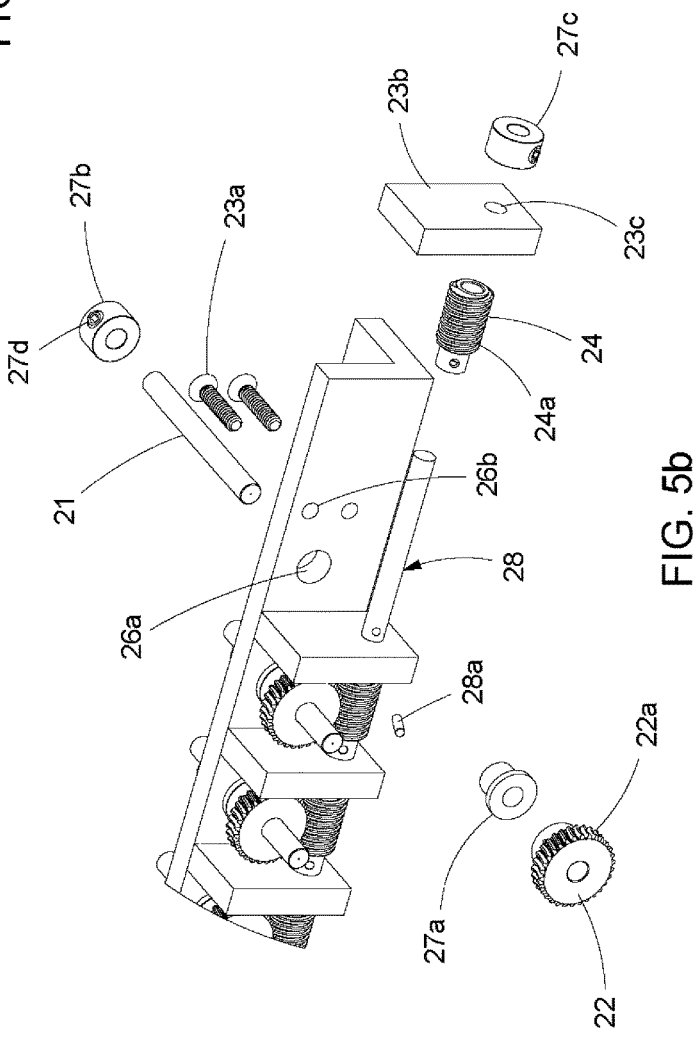
FIG. 5a
FIG. 5b

GROWING SPINE MODEL

CROSS-REFERENCE TO RELATED APPLICATIONS

This application claims the benefit of, and priority to, U.S. Provisional Patent Application Ser. No. 61/902,334, which was filed on Nov. 11, 2013, the entire contents of which is hereby incorporated herein by reference.

TECHNICAL FIELD

The present disclosure relates to orthopedic surgical devices for stabilizing and fixing the bones and joints of a body. Particularly, the present disclosure relates to a growing spine model that simulates the effects of changing relative positions of vertebral bodies in a spinal column (e.g., expansion and contraction) and the resulting three dimensional impact on the spinal column.

BACKGROUND

The spinal column is a complex system of bones and connective tissues that provides support for the human body and protection for the spinal cord and nerves. The human spine is comprised of thirty-three vertebrae at birth and twenty-four as a mature adult. Between each pair of vertebrae is an intervertebral disc, which maintains the space between adjacent vertebrae and acts as a cushion under compressive, bending, and rotational loads and motions.

There are various disorders, diseases, and types of injury that the spinal column may experience in a lifetime. The problems may include, but are not limited to, scoliosis, kyphosis, excessive lordosis, spondylolisthesis, slipped or ruptured disc, degenerative disc disease, vertebral body fracture, and tumors. Persons suffering from any of the above conditions typically experience extreme and/or debilitating pain, and often times diminished nerve function.

Conventionally, surgeons receive training in the use of orthopedic devices to correct vertebral column injuries and diseases by the application of methods and devices on cadavers. The amount of training for each surgeon is necessarily limited by the expense, availability, scheduling, and other logistic requirements associated with the use of cadavers. One drawback of using cadavers is that the biomechanical behavior and particularly soft tissue forces on the spinal column when applying methods and devices to a cadaver are far different from that which are normally experienced in a surgical procedure on a living patient.

Further, spine surgeons, when planning for a surgical procedure on a specific patient, normally study two-dimensional imaging data of the patient and lack an opportunity for a hands-on rehearsal of a method prior to operating on the patient. In recent years there has been a growing number of orthopedic practices and hospitals that have made the transition from film to all digital environments. Software based tools for orthopedic image review, analysis, and preoperative planning are becoming conventional tools of the orthopedic surgeon. While advances in surgical planning have been made, they are simply limited to improvements in providing two-dimensional data for study and planning. To receive hands-on training or to rehearse a surgical method, a surgeon is still limited to the use of cadavers.

With such training and rehearsal limitations, it is not uncommon during an actual surgical procedure for a surgeon to encounter unforeseen anatomical or biomechanical conditions that may require an immediate revision of the surgical plan as it proceeds. The need to provide more numerous and less expensive ways to train surgeons or to permit hands-on surgery planning and rehearsal in the use of spinal surgery methods and devices is particularly needed in the treatment of conditions, such as scoliosis. It is not uncommon in the surgical treatment of scoliosis that the forceful manipulation and realignment of the spinal column can be a long, complicated mechanical effort that may include a potential of damage to anatomical structures in the proximity of the spinal column. In addition to the obvious training benefits that a three dimensional hands on device could provide, the manual rehearsal of planned methods in the treatment of scoliosis could potentially provide a faster, more effective, and safer surgical correction for the patient.

One known modeling system is disclosed in U.S. Pat. No. 8,113,847 to Boachie-Adjei that is assigned to K2M, Inc. The entire contents of this patent are incorporated herein by reference.

Thus, a need exists for a three dimensional hands on system to provide a spinal surgery modeling system that can be used by surgeons for training in the use of new devices and methods and can also be used in the planning and manual rehearsal of surgical procedures for patients.

SUMMARY

The present disclosure relates to orthopedic surgery and, in particular, to surgical devices, prosthesis, and methods for stabilizing and fixing bones and joints of a body. Particularly, the present disclosure relates to a system for modeling surgical procedures using surgical methods, devices, and instruments as a training or surgery rehearsal system that can provide a user with an anatomically and biomechanically realistic model in a non-surgical environment. More particularly, the present disclosure relates to a spinal surgery modeling system that can engage with a model of a spine so as to configure the spine in a desired alignment and with selected degrees of force vectors biasing the spine model in selected positions so as to provide a spine modeling system that can be used as a surgeon training device or as a spinal surgery rehearsal platform.

The spinal surgery modeling system of the present disclosure provides a hands on device that is capable of presenting a three dimensional model of a spinal column that can be configured to have any desired variation of spinal alignment and can be positioned in the three dimensional model of the spinal column with the application of tension members that provide a bias so as to simulate the biomechanical feel and behavior of a patient's spinal column.

Also provided is a spinal surgery modeling system that is capable of securing any of a variety of models of spinal columns that can be selected by size and conformation to simulate, for example, pediatric, adult, and geriatric spinal columns.

Also provided is a spinal surgery modeling system useful for simulating common deformities such as scoliosis, kyphosis, sagittal imbalance, and other spinal abnormalities.

Also provided is a spinal surgery modeling system that can be prepared to simulate the anatomy and biomechanics of a surgery patient such that a three dimensional hands on surgery rehearsal platform is provided.

The present disclosure provides a device that can simulate a spine as it is growing, simulating the growth of the vertebral bodies and the discs.

In one embodiment, the device contains two sets of worm and worm gear mechanisms that are anchored to a spine model and to an angled bracket, respectively. The worm gear on the angled bracket may be driven by a screw driver or other such instrument, which, in turn, drives the worm on the spine model and drives a button that is attached to the worm gear of the spine model in an upward direction which, in turn, moves the vertebral bodies apart.

The foregoing and other features, aspects, and advantages will become apparent to one skilled in the art to which the disclosed system and devices relate upon consideration of the following description of exemplary embodiments with reference to the accompanying drawings.

BRIEF DESCRIPTION OF THE DRAWINGS

FIG. 2a is an exploded view, with parts separated, of a drive mechanism and a vertebral body of the spine surgery modeling system of FIG. 1;

FIG. 2b is an assembled, perspective view of the drive mechanism attached to the vertebral body of FIG. 2a in a collapsed state;

FIG. 2c is a perspective view of a worm and a worm gear of the drive mechanism of FIGS. 2a and 2b;

FIG. 2d is a perspective view of the drive mechanism attached to the vertebral body of FIG. 2a in an expanded state;

FIG. 3a is a side view of the spine surgery modeling system of FIG. 1 in a pre-growth state;

FIG. 3b is a side view of the spine surgery model system of FIG. 1 in a post-growth state;

FIG. 3c is an enlarged view of the area of detail 3C of FIG. 3b showing the worm and the worm gear of FIG. 2c attached to vertebral bodies;

FIG. 4a is a side view of the spine surgery modeling system of FIG. 1 in a pre-growth state showing the drive mechanism of FIG. 2b in cross-section;

FIG. 4b is an enlarged view of the area of detail 4b of FIG. 4a showing the vertebral bodies and the drive mechanisms in a pre-growth state;

FIG. 4c is a side view of the spine surgery modeling system of FIG. 1 in a post-growth state showing the drive mechanism of FIG. 2d in cross-section;

FIG. 4d is an enlarged view of the area of detail 4d of FIG. 4c showing the vertebral bodies and the drive mechanisms in an expanded state;

FIG. 5a is a perspective view of an angled bracket assembly of the spine surgery modeling system of FIG. 1;

FIG. 5b is an exploded view, with parts separated, of the angled bracket assembly of FIG. 5a.

DETAILED DESCRIPTION

Figure 1:
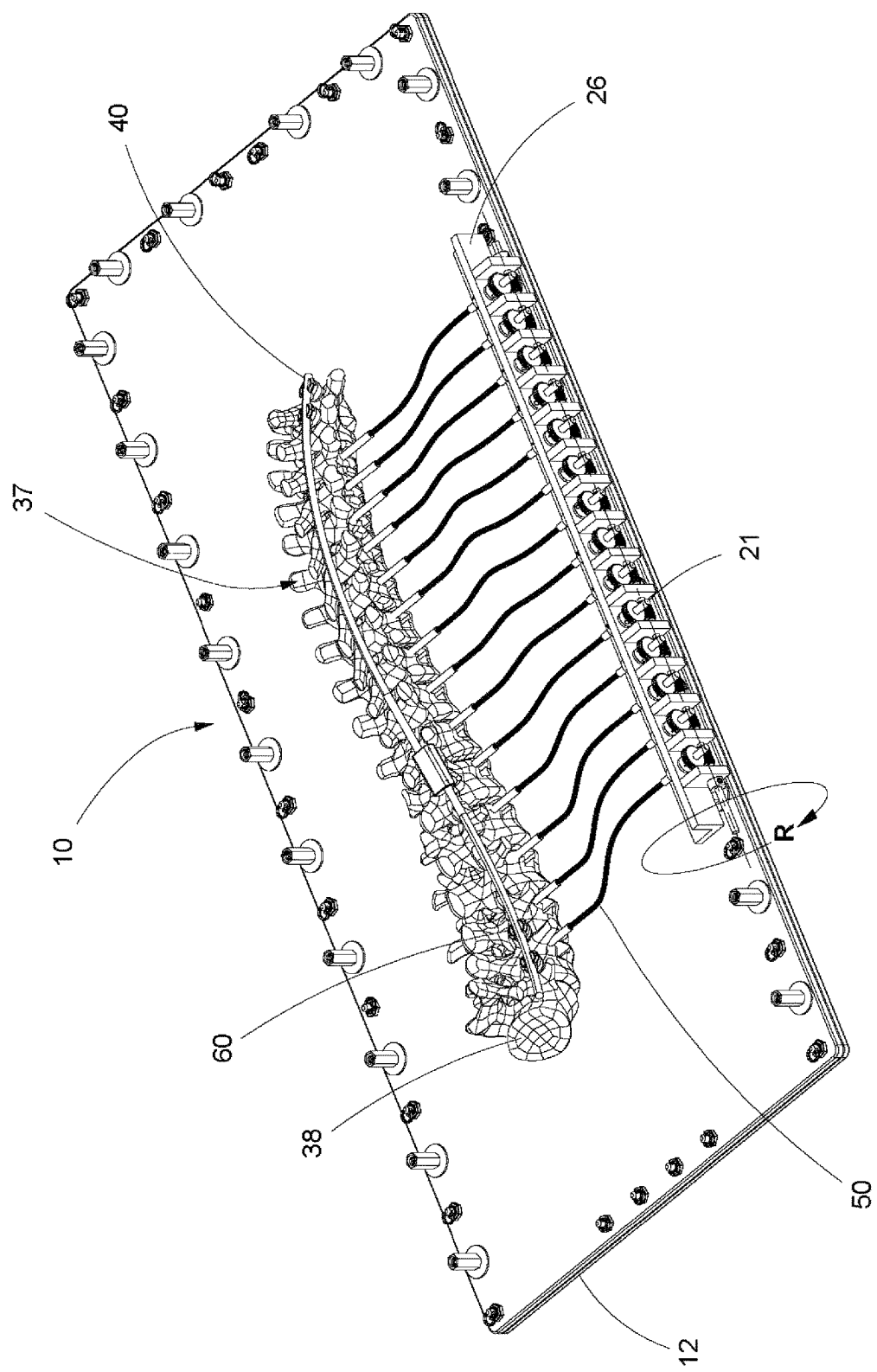
FIG. 1 is a top perspective view of a spine surgery modeling system in accordance with an embodiment of the present disclosure.

Detailed embodiments of the spine surgery modeling system of the present disclosure are disclosed herein; however, it is understood that the following description and each of the accompanying figures are provided as being exemplary embodiments of the present disclosure. Thus, the specific structural and functional details provided in the following description are non-limiting, and serve merely as a basis for the subject matter defined by the claims provided herewith. The device/system described below can be modified as needed to conform to further development and improvement of materials without departing from the disclosed concept. Accordingly, various modifications may be made without departing from the spirit and scope of the present disclosure.

Embodiments of the present disclosure are now described in detail with references to the drawings in which like reference numerals designate identical or corresponding elements in each of the several view. As used herein, the term "clinician" refers to a doctor, nurse, or other care provider and may include support personnel. Throughout this description, the term "proximal" refers to the portion of a device or component thereof that is closer to a clinician and the term "distal" refers to the portion of a device or component thereof that is farther from a clinician. In addition, the term "cephalad" is used in this application to indicate a direction toward a patient's head, whereas the term "caudad" indicates a direction toward a patient's feet. Further still, for the purposes of this application, the term "lateral" indicates a direction toward a side of the body of a patient, i.e., away from the middle of the body of the patient, whereas "medial" refers to a position toward the middle of the body of a patient. The term "posterior" indicates a direction toward the patient's back, and the term "anterior" indicates a direction toward the patient's front. Additionally, in the drawings and in the description that follows, terms such as front, rear, upper, lower, top, bottom, and similar directional terms are used simply for convenience of description and are not intended to limit the disclosure.

Referring now to FIGS. 1-5b, a spine surgery modeling system 10 includes a spine model 37, a drive mechanism 30 attached to the spine model 37, and a gear mechanism 20 attached to an angled bracket 26. The spine model 37 and the angled bracket 26 may be attached to a base 12 of the spine surgery model system 10. The drive mechanism 30 and the gear mechanism 20 are tethered to each other with a flexible shaft 50. While the drive mechanism 30 and the gear mechanism 20 are discussed singularly, a person of ordinary skill in the art can readily appreciate that the spine surgery modeling system 10 of the present disclosure may also include a plurality of substantially identical drive mechanisms 30 and gear mechanisms 20 tethered together by flexible shafts 50.

The spine model 37 includes vertebral bodies 38 which define disc 39 spaces between adjacent vertebral bodies 38. The spine model 37 is a model of a spinal column that can be selected by size and conformation to simulate, for example, pediatric, adult, and geriatric spinal columns. The spine model 37 may have one or more spinal constructs attached thereto, such as a rod 40 and/or other implant including, but not limited to, pedicle screws 60. The spine model 37 may simulate common spinal deformities and other spinal abnormalities, and/or spinal growth via movement of the drive mechanism 30 and the gear mechanism 20. Although the present disclosure refers to vertebral bodies 38, the vertebral bodies 38 of the present disclosure are human analogues formed from artificial materials that have characteristics substantially similar to human vertebral bones. Suitable materials include polyurethane foams having either an open cell structure or a closed cell structure for emulating either cortical bone and/or cancellous bone. Other suitable analogues are commercially available from suppliers such as Pacific Research Laboratories, Inc. under the trade name SAWBONES®.

As shown in FIGS. 2a-2d, in conjunction with FIG. 1, the drive mechanism 30 is inserted into a vertebral body 38 of the spine model 37. The drive mechanism 30 includes a worm 32, a rigid shaft 33, a worm gear 34, a pin 35, and a button 36. The rigid shaft 33, which is attached to an end of the flexible shaft 50, extends through the worm 32 and is pinned to the worm 32 via pin 35. The worm 32 has threads 32a on an external surface thereof which engage teeth 34a on an external surface of the worm gear 34. The button 36 extends into a through hole 34b of the worm gear 34 and includes partial threads 36a which engage threads 34c disposed in the through hole 34b of the worm gear 34. Rotation of the rigid shaft 33 rotates the worm 32 which, in turn, rotates the worm gear 34 which, in turn, moves the button 36 in or out of the through hole 34b of the worm gear 34 depending on the direction of movement of the worm gear 34. For example, as the rigid shaft 33 is rotated in the direction of arrow R in FIG. 2d, the button 36 moves in an upward direction along arrow G towards an expanded state and drives adjacent vertebral bodies 38 apart to represent an increase in disc 39 height, as shown, for example, in FIGS. 3a-4d. The button 36 may be moved in a downward direction towards a collapsed state (e.g., FIG. 2b) to represent a decrease in disc 39 height.

As shown in FIGS. 5a and 5b, in conjunction with FIG. 1, the gear mechanism 20 is attached to the angled bracket 26 which together are part of an angled bracket assembly 25. The gear mechanism 20 include a rigid shaft 21, a worm gear 22, and a worm 24. The rigid shaft 21 is attached to an end of the flexible shaft 50 opposite the rigid shaft 33 of the drive mechanism 30. The rigid shaft 21 extends through a hole 26a defined in the angled bracket 26, a bushing 27a, and the worm gear 22. The worm gear 22 has teeth 22a which interact with threads 24a of the worm 24 and can transfer motion to the worm 24. The bushing 27a is used with a bushing 27b having an adjustable screw 27d which may be loosened to move the rigid shaft 21 relative to the worm 24 and then tightened to keep the rigid shaft 21 in place so that the worm gear 22 does not disengage from the worm 24. The bushings 27a and 27b may also be adjusted to move the rigid shaft 21 and disengage the worm gear 22 from the worm 24 or offset the position of the worm gear 22 relative to the worm 24 to change a rate of rotation of the worm gear 22. The worm 24 is pinned in place onto a rigid shaft 28 via pin 28a. The rigid shaft 28 is inserted through holes 23c defined in wall segments 23b of the angle bracket assembly 25 and into a bushing 27c. The wall segments 23b are screwed into place on the angled bracket 26 through holes 26b in the angled bracket 26 via screws 23a. An end 28b of the rigid shaft 28 can be attached to a driver or other like instrument in order to rotate the gear mechanism 20. Rotation of the gear mechanism 20 causes a corresponding rotation of the rigid shaft 33 of the drive mechanism 30 via the flexible shaft 50.

In an exemplary method of use, a clinician will apply a rotational force to the rigid shaft 28 in order to cause the buttons 26 of the drive mechanisms 30 to move up in the direction of arrow G in FIG. 2d, which drives the vertebral bodies 38 further apart, as shown for example in FIGS. 3b and 4d, which simulates a spine growing as would happen in a child or young adult. A clinician may adjust the rigid shaft 21 of one or more gear mechanisms 20 to move the respective worm gears 22 relative to the worms 24 prior to applying the rotational force to the rigid shaft 28 to simulate a deformity or abnormality of the patient's spine.

Figure 6:
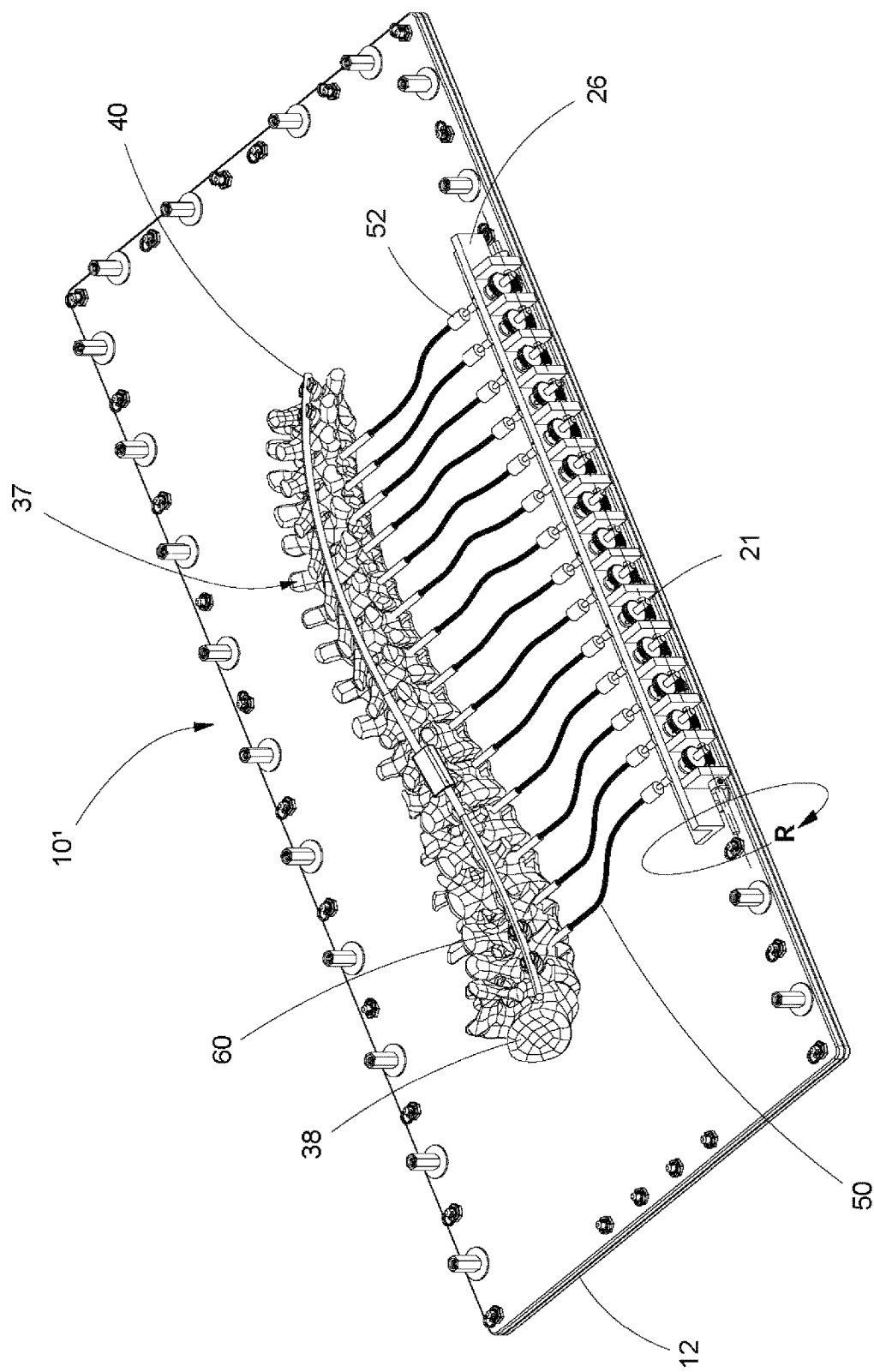
FIG. 6 is a top perspective view of a spine surgery modeling system in accordance with an alternate embodiment of the present disclosure.

Referring now to FIG. 6, another embodiment of the spine surgery modeling system 10' is shown. Spine surgery modeling system 10' includes a spine model 37, a drive mechanism 30 attached to the spine model 37, and a gear mechanism 20 attached to an angled bracket 26. Spine surgery modeling system 10 is substantially identical to spine surgery modeling system 10 except that it includes clutches 52 as are known in the art. Each clutch 52 is coupled to a flexible shaft 50 and each clutch 52 is independently operable to move the worm gear 22 of a respective gear mechanism 20 relative to the worm 24. Accordingly, a clinician can individually engage or disengage each of the gear mechanisms 20 and control the rate of rotation of each gear mechanism 20. This arrangement allows the clinician to manipulate the spine model 37 by controlling which vertebral bodies 38 are moved when the gear mechanisms 20 are actuated.

What is claimed is:

1. A spine surgery modeling system comprising:
   a spine model including vertebral bodies and a disc space defined between adjacent vertebral bodies; and
   a drive mechanism attached to one of the adjacent vertebral bodies of the spine model, the drive mechanism including:
   a first worm gear having teeth on an external surface thereof;
   a first worm having threads on an external surface thereof that engage the teeth of the first worm gear such that rotation of the first worm causes rotation of the first worm gear, the first worm defining a through hole, the first worm gear and the first worm disposed within the one of the adjacent vertebral bodies:
   a first rigid shaft extending through the through hole of the first worm and configured to rotate the first worm; and
   a button operatively engaged with the first worm gear and extending into the disc space such that rotation of the first worm gear causes movement of the button between collapsed and expanded states to change a height of the disc space.

2. The spine surgery modeling system of claim 1, wherein the button extends into a through hole defined in the first worm gear and includes partial threads that engage threads disposed in the through hole of the first worm gear.

3. The spine surgery modeling system of claim 1, wherein the drive mechanism is one of a plurality of same drive mechanisms, each drive mechanism of the plurality of same drive mechanisms attached to a separate vertebral body of the spine model.

4. The spine surgery modeling system of claim 1, further comprising a flexible shaft attached to the first rigid shaft.

5. The spine surgery modeling system of claim 1, further comprising at least one spinal construct attached to the spine model.

6. The spine surgery modeling system of claim 5, wherein the at least one spinal construct includes a pedicle screw.

7. The spine surgery modeling system of claim 5, wherein the at least one spinal construct includes an adjustable rod.

8. The spine surgery modeling system of claim 7, wherein the at least one spinal construct includes a plurality of pedicle screws coupled to the adjustable rod.

9. The spine surgery modeling system of claim 1, further comprising a gear mechanism configured to rotate the first rigid shaft of the drive mechanism, the gear mechanism comprising:
   a second worm gear having teeth on an external surface thereof;
   a second worm having threads on an external surface thereof that engage the teeth of the second worm gear such that rotation of the second worm causes rotation of the second worm gear; and
   a second rigid shaft extending through the second worm gear and configured to rotate the second worm gear.

10. The spine surgery modeling system of claim 9, further comprising first and second bushings coupled to the second rigid shaft and configured to set a position of the second worm gear relative to the second worm.

11. The spine surgery modeling system of claim 9, wherein the gear mechanism is attached to an angled bracket.

12. The spine surgery modeling system of claim 9, wherein the gear mechanism is one of a plurality of same gear mechanisms and the drive mechanism is one of a plurality of same drive mechanisms, wherein each gear mechanism of the plurality of same gear mechanisms is operatively engaged with one drive mechanism of the plurality of same drive mechanisms, and each drive mechanism of the plurality of same drive mechanisms is attached to a separate vertebral body of the spine model.

13. The spine surgery modeling system of claim 9, wherein the first and second rigid shafts of the drive and gear mechanisms are tethered together with a flexible shaft.

14. The spine surgery modeling system of claim 13, further comprising a clutch coupled to the flexible shaft and configured to move the second worm gear relative to the second worm.

15. The spine surgery modeling system of claim 13, wherein the gear mechanism includes a third rigid shaft extending through a through hole defined in the second worm such that rotation of the third rigid shaft drives movement of the button of the drive mechanism.

16. A method of simulating a spine, comprising:
adjusting a disc height between adjacent vertebral bodies of a spine model by rotating a first rigid shaft of a drive mechanism, the first rigid shaft extending into one of the adjacent vertebral bodies of the spine model to effect rotation of a first worm and a first worm gear of the drive mechanism that are both disposed within the one of the adjacent vertebral bodies, rotation of the first worm gear causing movement of a button of the drive mechanism between the adjacent vertebral bodies to change the disc height.

17. The method of claim 16, wherein adjusting the disc height further comprises rotating a second rigid shaft extending through a second worm gear of a gear mechanism, the second rigid shaft tethered to the first rigid shaft of the drive mechanism by a flexible shaft to effect rotation of the first rigid shaft.

18. The method of claim 17, wherein adjusting the disc height further comprises rotating a third rigid shaft extending through a second worm of the gear mechanism to effect rotation of the second rigid shaft.

19. The method of claim 18, further comprising adjusting a position of the second worm gear relative to the second worm.

20. The method of claim 19, wherein adjusting the position of the second worm gear further comprises actuating a clutch coupled to the flexible shaft to move the second worm gear relative to the second worm prior to rotating the third rigid shaft.

* * * * *